Patented Mar. 29, 1949

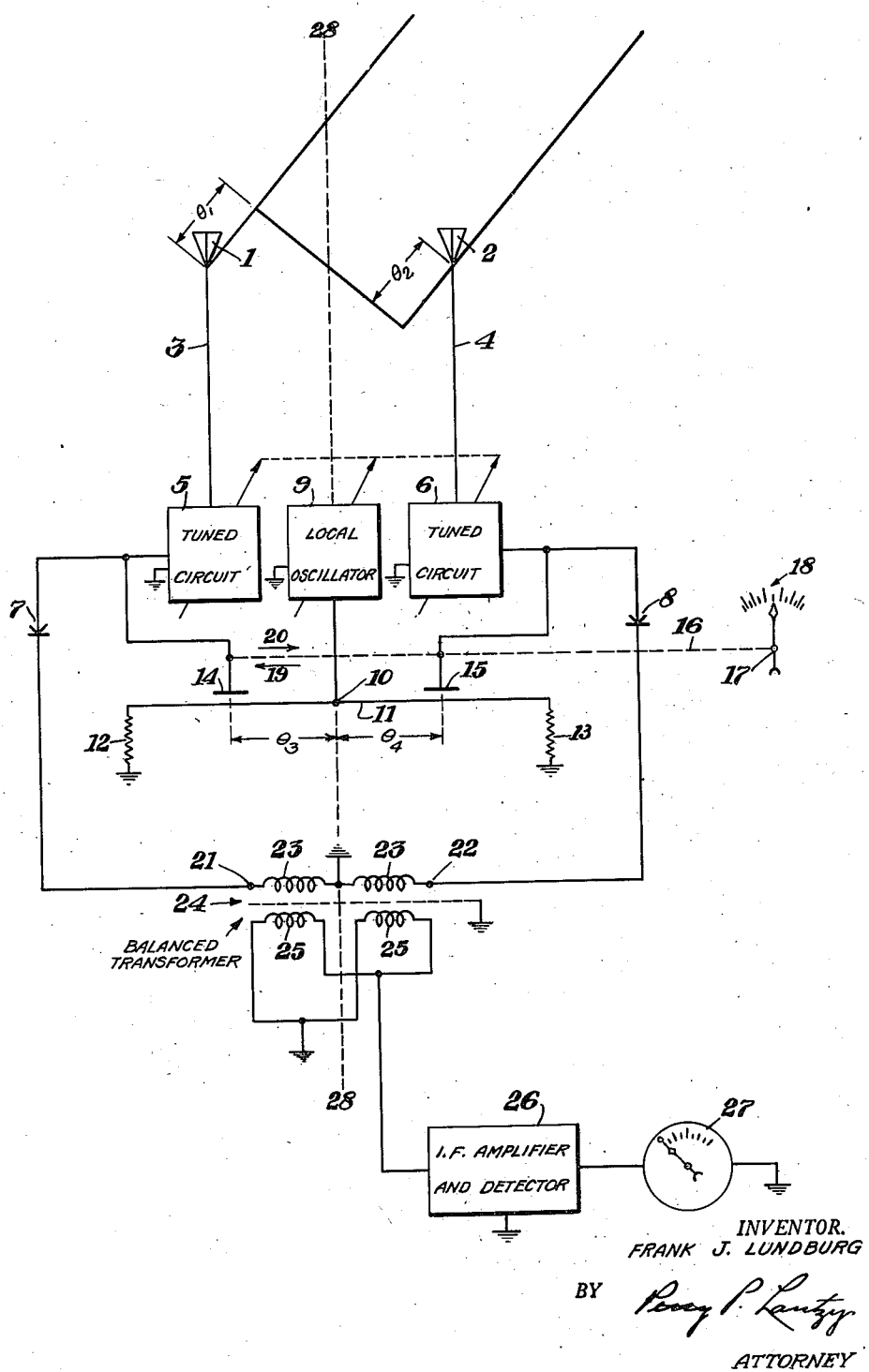

2,465,382

UNITED STATES PATENT OFFICE 2,465,382

DIRECTION FINDER

Frank J. Lundburg, New York, N. Y., assignor to Federal Telephone and Radio Corporation, New York, N. Y., a corporation of Delaware Application May 28, 1945, Serial No. 596,143

5 Claims. (Cl. 343—116)

The present invention relates to direction finders, particularly of the phase comparison type.

Certain types of direction finders depend for their operation on comparisons of the phase of the energy received by two spaced antenna units. In certain of such systems, the antenna units are coupled to each other or to terminating resistances by a pair of transmission lines (portions of which are usually artificial lines) and the receiver is coupled at various points along said lines.

If the transmission lines are electrically flat, that is, do not support standing waves, and the system is otherwise symmetrical, then the voltages at the electrical center of both transmission lines will be equal and in phase when the transmitter is equidistant from both antenna units. When the transmitter is closer to one antenna unit than to another, assuming the other conditions are the same, the point at which the voltages will be equal and in phase shifts to one side of the center of the transmission lines and the position of said point varies according to the line of direction to the transmitter. Thus by locating the points at which equal and in-phase voltages are encountered on the transmission line, an indication of the line of direction to the transmitter can be obtained.

In said systems, a large proportion of the energy received by the antenna units is dissipated in the terminations of their transmission lines. In certain types, such as M. Fuchs-7, for "Phase comparison systems," Serial No. 578,491, filed February 17, 1945, now Patent No. 2,407,659, granted September 17, 1946, and N. Marchand-M. Semel 12-1, for "Phase comparison systems," Serial No. 578,741, filed February 19, 1945, this energy is dissipated in terminating resistances; in others, such as N. Marchand-7 for "Shiftable directional antennas," Serial No. 553,562, filed September 11, 1944, this energy is dissipated in the other antenna units of the pair usually in the form of heat or reradiated energy. Furthermore in such receivers, it is impossible to keep the transmission lines electrically flat despite the use of matching terminating resistances since the matching is upset by the varying amount of energy drained from the lines by the direction-finding receiver as it is coupled to various points along said lines. These factors—the relatively large loss of energy and the lack of flatness of the lines along which the phase is being measured—are undesirable and lessen the efficiency and accuracy of operation.

An object of the present invention is the provision of an improved direction finder of the phase comparison type.

Another object of the present invention is the provision of a direction finder of the phase comparison type in which a relatively small amount of the energy picked up by the antenna system is dissipated between the antenna system and the receiver.

Another object of the present invention is the provision of a direction-finding receiver of the phase comparison type in which the transmission lines along which the phase comparison is made are substantially electrically flat.

Still another object of my invention is the provision of a direction finder of the phase comparison type in which the transmission lines used for determining phase relations are connected in auxiliary circuits instead of the antenna output circuits.

In accordance with my invention, signal energy from two spaced and separate antenna units is applied to two separate mixers or converters. Energy from a local oscillator is also applied to these mixers but the phase of the local energy applied to one of said mixers is adapted to be inversely varied with respect to the phase of the local energy applied to the other of said mixers. The signal energy and the local energy are mixed in each mixer with the phases of the local energy being inversely varied until the resultant output energies of the mixers are equal and in phase. By then comparing the phase of the local energy applied to one mixer with respect to the phase of the local energy applied to the other mixer, an indication of the difference in phase between the incoming signal energies is obtained; the last mentioned difference in phase indicating the direction line of the transmitter.

Other and further objects of the invention will become apparent and the invention will be best understood from the following description of an embodiment thereof, reference being had to the drawing in which the single figure is a schematic and block diagram of a direction finder embodying my invention.

Referring now to the drawing, signal energy from antenna units 1 and 2 is applied through transmission lines 3 and 4 respectively to tuned circuits 5 and 6 respectively, the output of said tuned circuits 5 and 6 being fed to asymmetrical conductors or detectors 7 and 8 respectively which detectors 7 and 8 serve as mixers in which the signal energy is mixed with energy from a local oscillator 9, the tuning of said oscillator being ganged with the tuning of said circuits to produce a fixed beat frequency in the output of said mixers.

In accordance with my invention, the phase of the energy from the local oscillator applied to the detector 7 is adapted to be varied inversely with the phase of the energy applied to detector 8. To enable this selection and inverse variation of the phases, I provide means of which the following is a preferred form. The output of the local oscillator 9 is applied to the center or midpoint 10 of a transmission line 11 terminating in its opposite ends in matching terminating resistances 12 and 13 respectively. A pair of capacitive pick-ups which may be in the form of capacitive plates 14 and 15 respectively are positioned on opposite sides of the center 10 in association with the line 11, the energy picked up by plate 14 being delivered to mixer 7 while the energy picked up by plate 15 is delivered to mixer 8. Plates 14 and 15 are mechanically linked together as indicated by line 16, and to a pointer 17 associated with a scale 18.

If the transmission line 11 is flat, it will be seen that the phase thereof varies symmetrically from the midpoint 10 toward the resistance 12 and from the midpoint 10 toward the resistance 13. If the plates 14 and 15 are moved in the direction of arrow 19, the phase of plate 15 will approach the phase of the midpoint 10, whereas the phase of plate 14 will move or shift away from said phase. The opposite is true if the plates 14 and 15 are moved in the direction of arrow 20. It will thus be seen that the phases applied through capacitive plates 14 and 15 to the mixers 7 and 8 are varied inversely. The output of detectors 7 and 8 are applied to the ends 21 and 22 respectively of the primary coils 23 of a balanced transformer 24. The capacitive plates 14 and 15 are moved until the energy at end 21 of the primary 23 is equal in amplitude and is in phase with the energy at end 22. The resulting position of the pointer 17 on the scale 18 then gives an indication of the direction from which energy is being received. As will be appreciated from a reading of the aforementioned copending application of N. Marchand 7, the scale 18 will be non-linear unless while the pointer 17 is moved linearly over the scale the coupling plates 14 and 15 are moved as a sinusoidal function of the linear movement in relation to the transmission line 11.

To determine when the energies at 21 and 22 are equal and in phase, the balanced transformer 24 is tuned to the difference (or sum) of the signal energy and the frequency of the local oscillator 9. The secondary coils 25 of transformer 24 are connected to each other in parallel and to an intermediate frequency amplifier and detector 26, the output of said amplifier and detector 26 being applied to a suitable indicator 27 which may be in the form of a milliammeter or the like. When the energies at ends 21 and 22 of the primary 23 are equal and in phase no energy will be delivered by the secondary to the amplifier and detector 26 and the meter 27 will indicate this.

In order for this system to operate properly, it should have electrical symmetry at each side of the line 28—28. If the foregoing relation exists, then the received signal of frequency $p$ and amplitude $E_1$ will be applied to circuits 5 and 6 with the following phase relation, the initial phase of the signal taken as zero:

At 5:
$$E_1 \cos (2\pi pt + [-\theta_1])$$

At 6:
$$E_1 \cos (2\pi pt + \theta_2)$$

The local oscillator signal of frequency $q$ and amplitude $E_2$ will have the following phase relation at 5 and 6 (initial phase assumed zero):

At 5:
$$E_2 \cos (2\pi qt - \theta_3)$$

At 6:
$$E_2 \cos (2\pi qt - \theta_4)$$

For the purpose of simplifying the illustration the two detectors F and G will be assigned a square law characteristic and since the transformer J is tuned to a frequency $f = p - q$ then a voltage will be developed from end 21 to ground and end 22 to ground as follows:

At 21 to ground:
$$KE_1E_2 \cos (2\pi ft - \theta_1 + \theta_3)$$

At 22 to ground:
$$KE_1E_2 \cos (2\pi ft + \theta_2 + \theta_4)$$

where $K$ is a constant having the dimensions of conversion transconductance for detectors 7 and 8.

When $(\theta_3 - \theta_1) = (\theta_2 + \theta_4) = \theta$ the two voltages from 21 to ground and 22 to ground will be equal in amplitude and phase. Connecting the secondary 25 of the transformer 24 in a bucking arrangement, zero signal voltage will be applied to the intermediate amplifier and detector 26 giving a signal null when the above phase relation, $\theta$, exists. Departure from this phase relation will produce a signal level at the input to 26.

By making the capacity between capacitive plate 14 and transmission line 11, and plate 15 and transmission line 11 as small as possible, very little of the signal energy will be transmitted by means of these plates 14 and 15 to be dissipated in the terminating resistances 12 and 13. At the same time if such capacitances are small, the proportion of energy taken from transmission line 11 and applied to the mixers 7 and 8, will be so slight that the line 11 will remain substantially electrically flat. By increasing the output of the local oscillator, it is possible to make these capacities very small and still provide enough energy for mixing in the detectors 7 and 8.

While I have described the details of one specific embodiment of my invention, it will be apparent from the foregoing description that numerous other embodiments differing from that illustrated may be constructed utilizing my invention. For example, the indicator may be a cathode ray oscillograph tube having a linear sweep, while the capacitive plates 14 and 15 are moved back and forth across the transmission line 11 as a harmonic function of said linear sweep, as described more fully in the aforementioned copending application N. Marchand-7. Accordingly, while I have described above the principles of my invention in connection with specific apparatus, it is to be clearly understood that this description is made only by way of example and not as a limitation on the scope of my invention as defined in the accompanying claims.

I claim:

1. A direction finder comprising a pair of mixers, a pair of spaced apart antenna units each coupled to separate ones of said mixers, a local oscillator supplying energy to both of said mixers, means for varying the phase of the energies supplied by said oscillator to one of said mixers in relation to the phase of the energy supplied by said oscillator to the other of said mixers, an indicator means controlled by the outputs of said mixers, said phase varying means comprises a transmission line coupled at one end to the output of said oscillator, a matching resistive impedance terminating the other end of said line, a capacitive coupler adapted to be capacitively coupled to said transmission line at a selected one of a number of points on said line, and means for coupling said capacitive coupler to said one of said mixers.

2. A direction finder comprising a pair of mixers, a pair of spaced apart antenna units each coupled to a separate one of said mixers, a local oscillator supplying energy to both said mixers, means for varying the phase of said energy supplied by said oscillator to one of said mixers while inversely varying the phase of said energy supplied by said oscillator to the other of said mixers, and indicator means controlled by the outputs of said mixers, said phase varying means comprises a transmission line coupled at the midpoint thereof to the output of said local oscillator, a pair of matching resistive impedances terminating the ends of said transmission line, a pair of capacitive couplers disposed on opposite sides of said midpoint and each adapted to be coupled to a selected one of a number of points on the side of said line with which each of said couplers is associated, means for moving said capacitive couplers inversely with respect to the midpoint of said transmission line, and means coupling each of said capacitive couplers to a separate one of said mixers.

3. A direction finder according to claim 1 wherein said indicator means is adapted to indicate when the outputs of said mixers are equal in phase, and said phase-varying means is calibrated to indicate the relative phase of energy applied to the mixers.

4. A direction finder comprising a pair of mixers, a pair of spaced apart antenna units each coupled to a separate one of said mixers, a local oscillator supplying energy to both said mixers, means for varying the phase of said energy supplied by said oscillator to one of said mixers in relation to the phase of said energy supplied by said oscillator to the other of said mixers, said phase-varying means being calibrated to indicate the relative phases applied to said mixers, a balanced transformer having each end of its primary connected to the output of a separate one of said mixers, and an indicator coupled to the secondary coils of said transformer.

5. A direction finder comprising a pair of mixer circuits and a pair of spaced apart antenna units coupled to separate ones of said mixer circuits, a source of modulation signals, means for applying modulation signals to each of said mixer circuits comprising separate terminated transmission lines, means for controlling the phase of said applied modulation signals comprising means for controlling the point of coupling between each of said transmission lines and said mixer circuits and means for comparing the output of each of said mixer circuits to obtain a bearing indication of antenna received signals.

FRANK J. LUNDBURG.

REFERENCES CITED

The following references are of record in the file of this patent:

UNITED STATES PATENTS

| Number | Name | Date |
| --- | --- | --- |
| 1,510,792 | Merritt | Oct. 7, 1924 |
| 1,839,290 | Bailey | Jan. 5, 1932 |
| 2,188,556 | Nickel | Jan. 30, 1940 |
| 2,275,254 | Falloon | Mar. 3, 1942 |